(No Model.)
A. C. McCORD.
CAR COUPLING.
No. 454,406. Patented June 16, 1891.
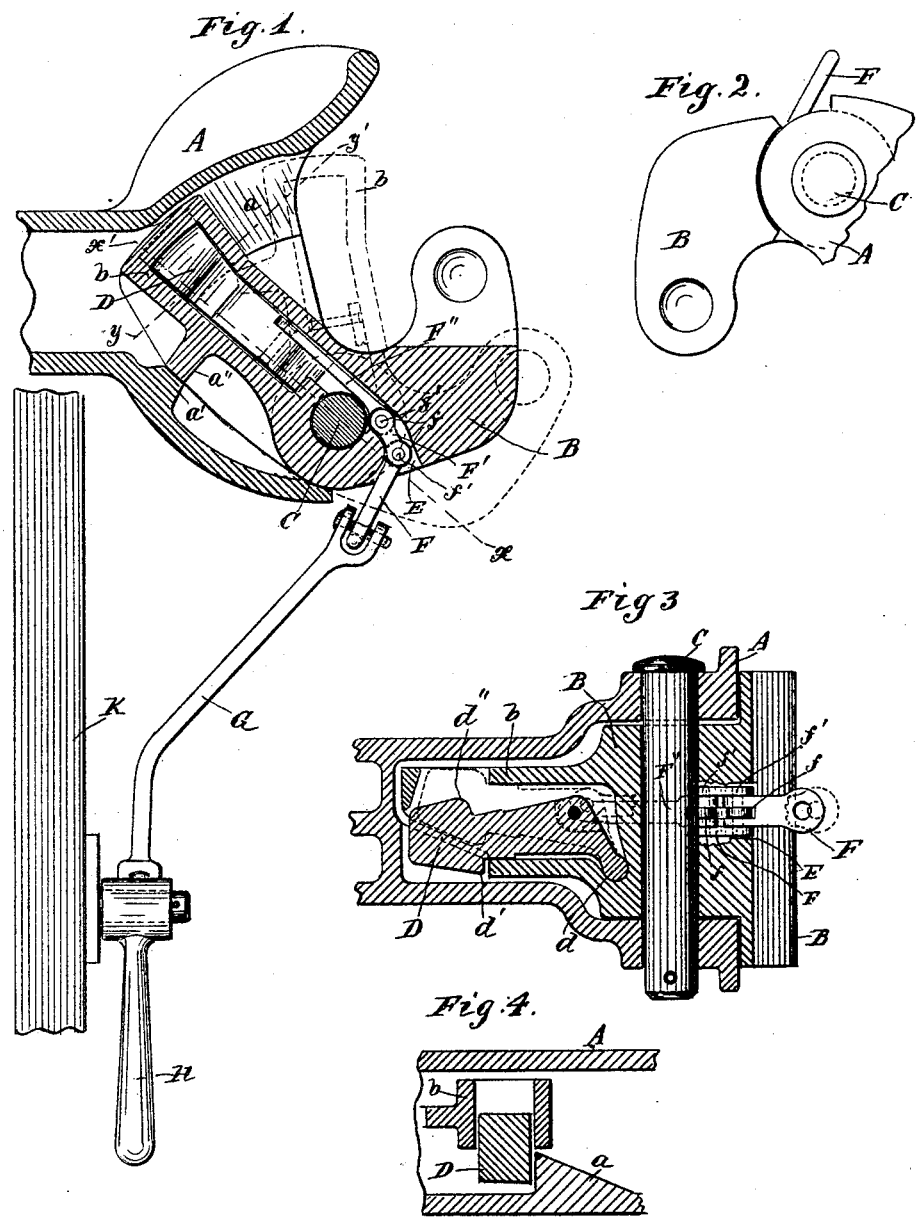
Witnesses
Emma F. Elmore
A. H. Opsahl.
Inventor.
Alvin C. McCord
By his Attorney.
Jas. F. Williamson

UNITED STATES PATENT OFFICE.

ALVIN CARR McCORD, OF MINNEAPOLIS, MINNESOTA.

CAR-COUPLING.

SPECIFICATION forming part of Letters Patent No. 454,406, dated June 16, 1891.

Application filed March 9, 1891. Serial No. 384,318. (No model.)

*To all whom it may concern:*

Be it known that I, ALVIN CARR McCORD, a citizen of the United States, residing at Minneapolis, in the county of Hennepin and State of Minnesota, have invented certain new and useful Improvements in Car-Couplers; and I do hereby declare the following to be a full, clear, and exact description of the invention, such as will enable others skilled in the art to which it appertains to make and use the same.

My invention relates to car-couplers of the class shown in the patent granted to me of date October 14, 1890, numbered 438,275, and in my pending reissue application on the same, filed by me of date January 8, 1891, under Serial No. 377,181. As in the said patent, I employ in my present construction a recessed coupler-head and a pivoted coupling-hook of the well-known standard type used in automatic twin couplers. In both cases the coupler-head is provided with a locking-lug and the coupling-hook with a locking-dog engageable therewith, and the releasing device for disengaging the dog is so arranged with reference to the coupling-hook that a pull on the same will first release and then open the hook. In my former patent this releasing device was connected with an unlocking-block pivoted in the beak of the coupling-hook, whereby the meeting of the beaks would release the dog and open the hooks, thus rendering the coupler automatic in all possible positions.

In my present construction I dispense with the unlocking-block and use only a manual device to effect the release and the opening of the hook. This hand device is connected with a lever on the car, so located as to be within reach of the brakeman without entering between the cars. The locking-dog is also of an improved construction, which renders the same more reliable and more durable.

A coupler embodying my improved construction is shown in the accompanying drawings, wherein like letters refer to like parts throughout.

Figure 1 is a view, partly in horizontal section and partly in plan, of one of the couplers in working position. Fig. 2 is a plan of part of the other coupler. Fig. 3 is a vertical section on the line X X' of Fig. 1, and Fig. 4 is a vertical section on the line Y Y' of Fig. 1.

A is the coupler-head, provided with a beveled locking-lug $a$ and the buffer-boss $a'$. B is the coupling-hook, pivoted at its angle to the coupler-head by the pivot-pin C. The extended heel-piece $b$ of the coupling-hook is recessed to form a seat for the locking-dog D, and is so constructed that it will clear the locking-lug $a$, the lower part of the same being cut away for this purpose. The back of the heel-piece is provided with a buffer-boss $a''$ for co-operation with the boss $a'$. The recess in the heel-piece is provided with a depression or dip in the bottom of its forward end, and the locking-dog is provided with a corresponding angular projection $d$, fitting in the same. Near its rear end the lower floor of the heel-piece is cut away to permit the outer end of the locking-dog to work through the same. The upper wall of the heel-piece may also be cut away to permit a longer swing to the head of the dog. The outer end of the dog is enlarged and is provided with shoulders $d'$ and $d''$, which engage with the rear vertical faces of the openings in the heel-piece and prevent the dog from being moved longitudinally in its seat when in its extreme uppermost or lowermost position.

The coupling-hook is provided with a longitudinal perforation E, extending from the forward end of the recess in the heel-piece to the exterior of the knuckle at a point in advance of its pivot. Working through this perforation is a jointed sectional rod F F' F'', having its inner end attached to the upper front angle of the locking-dog and its outer end connected by curved rod G with a bell-crank lever H, fulcrumed to the end sill K of the car at a point within reach without entering between the cars. The central section $F^4$ of the jointed rod is composed of a strap-link pivotally connected with the other sections and provided with anti-friction rollers $f$ on its pivot-pins $f'$. The perforation E is enlarged at its forward end, and its rear wall is of curvilinear form to better adapt the same to the action of the jointed rod.

The operation is as follows: In the coupling action the head of the locking-dog rides up the inclined face of the locking-lug and drops behind the same, securing the hook in its coupled position. By drawing the jointed rod outward by the bell-crank H or otherwise the dog will be tilted upon its angular projection $d$ as a fulcrum and have its head released from the lug $a$, and the continued pull on the jointed rod will open the coupling-hook in virtue of its leverage with reference to the pivot-pin C. The bell-crank H is preferably pivoted to swing in the vertical plane, and is made of considerable weight, so that the gravity of its mass will tend to hold the dog in its locking position. The longitudinal perforation E for the jointed rod crosses the vertical hole in the coupling-hook which receives the pivot-pin C, and the central section or strap part F' of the rod is larger than its rear section F''. The jointed rod is attached to the dog before the parts are placed in position. The rod and dog are then introduced to their seats through the opening in the rear floor of the heel-piece. The pivot-pin C is then placed in position and will take up so much of the perforation E that the rod and dog cannot slip backward out of their seats. The recess in the heel-piece is made sufficiently deep from top to bottom with reference to the size of the dog to permit its pivotal movement.

It will be seen that the locking-dog is simply a loose piece capable of being tilted on one of its angles, and that it is impossible to render the same inoperative by any wear or tear from rough usage. The manual device sustains but little strain, and, constructed as it is with pivotal joints and anti-friction rollers at its fulcrum or point of strain on the coupling-hook, will last indefinitely. The arrangement of this manual device so that by a continuous pull the coupling-hook may be unlocked and opened without entering between the cars is a great advantage and constitutes one of the principal features of my invention.

What I claim, and desire to secure by Letters Patent of the United States, is as follows:

1. In a car-coupler, the combination, with the coupler-head having a locking-lug, of a coupling-hook having a recess in its heel-piece, and a gravity locking-dog loosely seated in said recess and tiltable on one of its corners for releasing the same from the lug.

2. In a car-coupler, the combination, with the coupler-head, of the coupling-hook having a recessed heel-piece provided with a transverse depression or dip at its forward end, and the locking-dog loosely seated in said recess, provided with a head projecting through the heel-piece for engagement with said lug and provided with an angular extension fitting said depression and serving as a fulcrum upon which to tilt the dog to effect its release from the lug, substantially as described.

3. In a car-coupler, the combination, with the coupler-head having a bevel-faced locking-lug, of the coupling-hook having a recessed heel-piece provided with a transverse depression at its forward end, and the locking-dog loosely seated in said recess, having an angular extension at its front lower corner fitting said depression and serving as a fulcrum for the tilting or pivotal movement and provided with an enlarged and shouldered head working through said heel-piece, substantially as and for the purpose set forth.

4. In a car-coupler, the combination, with the coupler-head, of the coupling-hook having a recessed heel-piece, a movable locking-dog seated in said recess, and a combined releasing and opening device consisting of a connection from said dog passing through a perforation in the body of the hook to the exterior of the same at some point forward of its pivot, substantially as and for the purpose set forth.

5. The combination, with the recessed and perforated coupling-hook, of the locking-dog seated in said recess, and the manual releasing device consisting of a jointed rod attached to the dog and extending through said perforation to the exterior of the hook, substantially as described.

6. In a car-coupler, the combination, with the coupler-head provided with a locking-lug, of the pivoted coupling-hook carrying a locking-dog, a hand-lever on the car within reach without entering between the cars, and a connection from said lever to said dog and to the hook at some point forward of its pivot for releasing and opening the same by a single movement of the lever, substantially as described.

7. The combination, with the coupler-head, of the pivoted coupling-hook having a recessed heel-piece and provided with a longitudinal perforation extending from the recess across the vertical hole for the pivot-pin and to the exterior of the knuckle at a point in advance of its pivot, the jointed rod having an enlarged central section working in said perforation, and the pivot-pin engaging behind said central section, substantially as described.

8. The combination, with the recessed and perforated coupling-hook, of the locking-dog loosely seated in said recess, and a jointed rod for releasing the dog and opening the hook working through said perforation, the central section of which is provided with anti-friction rollers, substantially as described.

9. The car-coupler comprising the coupler-head, the pivoted coupling-hook provided with a recessed heel-piece and perforated, as described, the tilting locking-dog loosely seated in said recess, the jointed rod seated in said perforation, the hand-lever on the car within reach without entering between the cars, and the connection from the lever to the outer section of the jointed rod, substantially as described.

In testimony whereof I affix my signature in presence of two witnesses.

ALVIN CARR McCORD.

Witnesses:
D. W. McCORD,
CHAS. H. KING.